United States Patent
Shin et al.

(10) Patent No.: US 7,039,112 B2
(45) Date of Patent: May 2, 2006

(54) MOVING PICTURE MAILING SYSTEM AND METHOD

(75) Inventors: Jae-Seob Shin, Seoul (KR); Yeon-Bae Kim, Kyungki-do (KR); Sung-Gul Ryoo, Kyungki-do (KR); Hyoung-June Yi, Seoul (KR); Jae-Seung Ko, Kyungki-do (KR); Young-Min Choi, Seoul (KR)

(73) Assignee: Sang-Yong Kim, (KR)

( * ) Notice: Subject to any disclaimer, the term of this patent is extended or adjusted under 35 U.S.C. 154(b) by 645 days.

(21) Appl. No.: 09/893,269

(22) Filed: Jun. 26, 2001

(65) Prior Publication Data

US 2002/0051493 A1    May 2, 2002

(30) Foreign Application Priority Data

Jun. 26, 2000    (KR) ................................ 2000-35458

(51) Int. Cl.
*H04N 7/18*    (2006.01)
(52) U.S. Cl. .............................. 375/240.25; 375/240.26
(58) Field of Classification Search ...............................
375/240.01–240.29
See application file for complete search history.

(56) References Cited

U.S. PATENT DOCUMENTS

| 5,991,447 | A  | * | 11/1999 | Eifrig et al. ................. 382/236 |
| 6,484,156 | B1 | * | 11/2002 | Gupta et al. .................... 707/1 |
| 6,614,847 | B1 | * | 9/2003  | Das et al. .............. 375/240.16 |
| 2001/0052019 | A1 | * | 12/2001 | Walters et al. .............. 709/231 |
| 2004/0125876 | A1 | * | 7/2004  | Kodama et al. ........ 375/240.16 |

* cited by examiner

*Primary Examiner*—Andy Rao
(74) *Attorney, Agent, or Firm*—Blakely Sokoloff Taylor & Zafman (57) ABSTRACT

Disclosed is a moving picture mailing system which comprises a video signal capturing device for capturing digital video signals from video signal information of moving pictures; an audio signal capturing device for capturing digital audio signals from audio signal information of moving pictures; and a moving picture recorder for respectively receiving the video and audio signals from the video and audio signal capturing devices, compressing the video and audio signals using MPEG-4 video and audio compression techniques, multiplexing the compressed signals and transmitting combined bit streams to a moving picture mailing server.

24 Claims, 8 Drawing Sheets

MOVING PICTURE MAILING SYSTEM AND METHOD

BACKGROUND OF THE INVENTION (a) Field of the Invention

The present invention relates to a moving picture mailing system and method. More specifically, the present invention relates to a moving picture mailing system and method using multimedia data compression and decompression techniques.

(b) Description of the Related Art

Conventional moving picture mailing systems utilize their own coder/decoders (CODEC), moving picture experts group-4 (MPEG-4) video techniques or general voice compression techniques. Since it is difficult to compress images in real time, the images are initially stored in a storage device such as a hard disk drive, and are then compressed off line to be stored or transferred.

Also, the conventional moving picture mailing systems have a weak point in accessing the web in real time and freely transmitting and receiving the moving picture data. The moving picture mailing system attaches a moving picture file to general mail and then transfers the same, and a recipient receives the moving picture file, stores the file in a local memory, and decodes the same for reproduction. Therefore, a program for driving the moving picture mail and a large storage capacity for storing the same are needed.

Further, since the conventional moving picture mailing systems cannot concurrently control compressed video and audio data, the user cannot randomly manipulate the previously produced compressed video and audio data.

SUMMARY OF THE INVENTION

It is an object of the present invention to provide a moving picture mailing system and method for concurrently receiving images and compressing and transferring the same in real time.

In one aspect of the present invention, a moving picture mailing system comprises: a video signal capturing device for capturing digital video signals from video signal information of moving pictures; an audio signal capturing device for capturing digital audio signals from audio signal information of moving pictures; and a moving picture recorder for respectively receiving the video and audio signals from the video and audio signal capturing devices, compressing the video and audio signals using MPEG-4 video and audio compression techniques, multiplexing the compressed signals and transmitting combined bit streams to a moving picture mailing server.

The moving picture recorder comprises: an MPEG-4 video encoder for compressing the video signals captured by the video signal capturing device; an MPEG-4 audio encoder for compressing the audio signals captured by the audio signal capturing device; and an MPEG-4 multiplexer for multiplexing the compressed video and audio signals respectively output by the MPEG-4 video and audio encoders and outputting the combined bit streams.

In another aspect of the present invention, a moving picture mailing method comprises: capturing digital video and audio signals from information on video and audio signals of moving pictures; compressing the video and audio signals using the MPEG-4 video and audio compression technique; and multiplexing the compressed signals and transmitting combined bit streams to a moving picture mailing server.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIGS. 7($a$) to ($e$) show structures of a bit stream generated by an MPEG-4 multiplexer according to a preferred embodiment of the present invention;

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
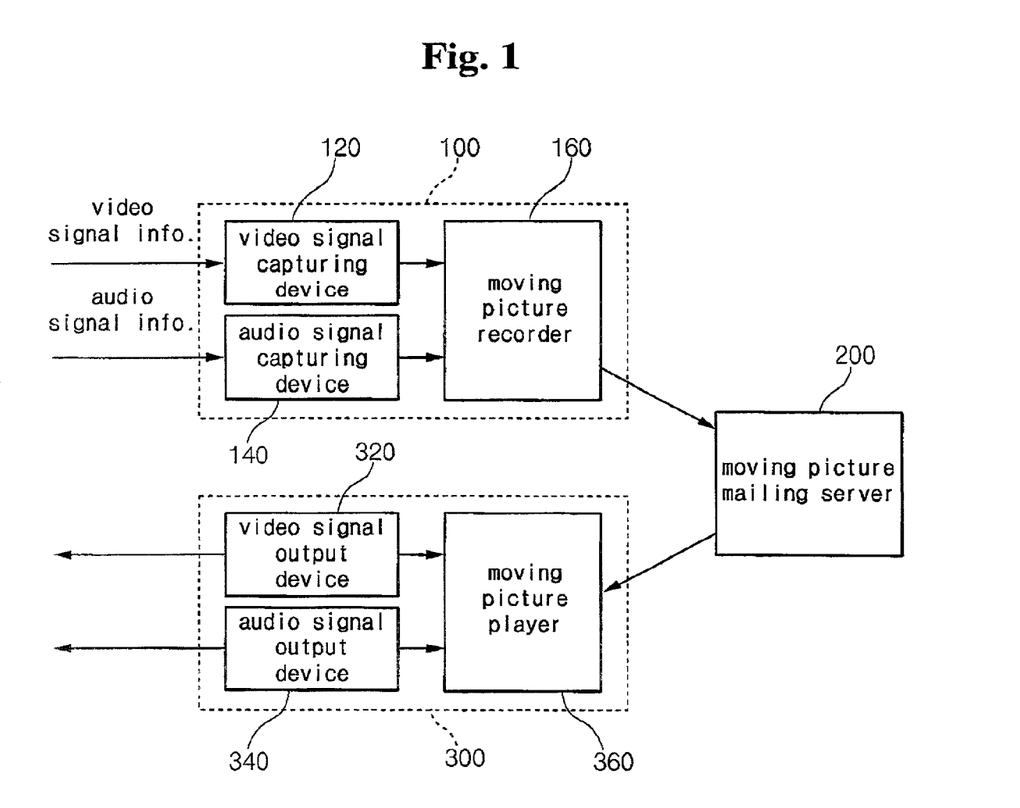
FIG. 1 shows a moving picture mailing system according to a preferred embodiment of the present invention.

FIG. 1 shows a moving picture mailing system according to a preferred embodiment of the present invention.

As shown, the mailing system comprises an addresser system 100, a moving picture mailing server 200 and an addressee system 300.

The addresser system 100 comprises a video signal capturing device 120, an audio signal capturing device 140 and a moving picture recorder 160. The video signal capturing device 120, such as a personal computer (PC) camera or a TV signal receiving card, captures video signals from video information of the moving pictures. A size of a screen according to the preferred embodiment can be adjusted by user's requests, and digital moving picture data formats input by the camera include RGB24, I420, YUV12 and YUV16.

The audio signal capturing device 140 such as a microphone captures audio signals from audio information.

The moving picture recorder 160 captures video and audio signals from the video signal capturing device 120 and the audio signal capturing device 140, respectively compresses the signals using an MPEG-4 video/audio signal compression technique, multiplexes the compressed video and audio signals, and transmits the multiplexed signals to the moving picture mailing server 200.

To make up for the weak points of the conventional moving picture mail, is the moving picture recorder 160 uses the simple profile of the MPEG-4 video rules in the case of compressing and decompressing the moving pictures and uses code excited linear prediction (CELP) of the MPEG-4 audio rules in the case of compressing and decompressing the audio data so as to increase the compression rates.

Figure 2:
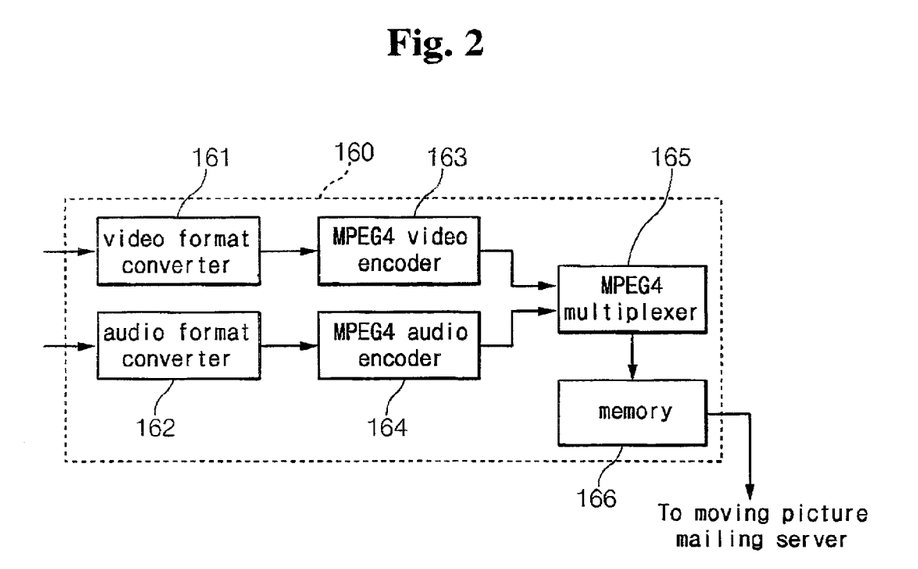
FIG. 2 shows a moving picture recorder according to a preferred embodiment of the present invention.

FIG. 2 shows a moving picture recorder according to a preferred embodiment of the present invention.

As shown, the moving picture recorder 160 comprises a video format converter 161, an audio format converter 162, an MPEG-4 video encoder 163, an MPEG-4 audio encoder 164, an MPEG-4 multiplexer 165 and a memory 166.

The video format converter 161 converts the captured video signals into reference video format signals in the case the signal format of the video signals captured from the video signal capturing device 120 is different from that of the reference video signals of the present invention. Since there are various kinds of digital moving picture data input according to the cameras, such as RGB24, I420, YUV12 and YUV16, it is necessary to convert the input moving pictures into reference video format signals. In the preferred embodiment, YUV 4:2:0 is used as the reference signal format since the signal format used for the MPEG-4 video signal compression is YUV 4:2:0.

The MPEG-4 video encoder 163 is a simple profile encoder of the MPEG-4 video unit and uses the YUV 4:2:0 data directly captured from the video signal capturing device 120 or converted by the video format converter 161 so as to compress corresponding data. The MPEG-4 video encoder 163 uses the intra video object plane (I-VOP), predictive video object plane (P-VOP), AC/DC prediction, four motion vectors (4MV) and unrestricted MV as reference tools provided by the simple profile of the MPEG-4 video, and also supports error resilience encoding.

The audio format converter 162 converts the signal format of the audio signals captured from the audio signal capturing device 140 into the reference audio signal format used by the present invention. In the preferred embodiment, signals of 8 KHz sampling frequency and 16-bit mono (one channel) per sample are used as the reference audio signals.

The MPEG-4 audio encoder 164 is a CELP encoder of the MPEG-4 audio unit and it compresses the audio data directly captured from the audio signal capturing device 140 or converted by the audio format converter 162. The MPEG-4 CELP audio unit configured by modeling human voices effectively compresses the voices, provides scalability on bit rates and supports the error resilience encoding function for noisy environments such as wireless environments. The audio unit according to the present invention encodes each frame for 100 milliseconds so as to maintain synchronization with the video signals.

The MPEG-4 multiplexer 165 multiplexes the compressed video and audio signals respectively output by the MPEG-4 video encoder 163 and the MPEG-4 audio encoder 164, and outputs combined bit streams. In this instance, differing from the conventional method, the multiplexing method according to the preferred embodiment of the present invention can vary the frame rates for performing the compression according to computer performance. According to the conventional multiplexing method, the frame rates per second must be maintained, and synchronization with the audio signals can be maintained only when the established frame rates are maintained. Therefore, in order to process data in real time, the frame rate for the hardware to process data in real time is to set to be a minimum value to perform a compression process. However, in the preferred embodiment, the frame rates are varied according to hardware performance, and the actual encoding reference time is provided to the MPEG-4 multiplexer 165 by millisecond and by frame so as to maintain the synchronization with the audio signals.

The memory 166 temporarily stores the bit streams output by the MPEG-4 multiplexer 165, and in the case a mail transmission instruction is provided, transmits stored information to the moving picture mailing server 200.

A function of the MPEG-4 multiplexer 165 will now be described.

Most of the conventional video compression methods use fixed frame rates, and the MPEG-4 method also uses fixed frame rates in the bit streams. Therefore, for example, in order to implement 15 frames per second (fps) to compress the images, the compression process must be terminated within $1/15$ second, and if this time elapses, a time code that is a field for inputting time information to the bit stream must be increased by as much as $1/15$ second so as to maintain the synchronization with the audio signals in the case of decoding. Hence, in order to compress the data in real time even when the number of frames to be processed per second changes according to hardware performance of the computer, it must be assumed that the hardware performances of the user are identical, and a demerit is that the frame rates must be fixed. For example, in the case a system with a Pentium 3 CPU processes 30 frames per second and another system with a Pentium 133 MHz CPU processes 2 to 3 frames per second, the frame rates are to be set to be the minimum specification (i.e., the Pentium 133 MHz CPU, in this example) excepting that the user establishes the encoding frame rates according to the system performance. However, in the preferred embodiment, since time information that captures an input image is inserted within the format of the signals combined by the multiplexer in each frame without using the time code provided to the compression bit streams of the video signals, and the time information is used for the time for displaying decoding data at a video decoder, the frame rates are differently implemented according to the system performance.

Also, according to the MPEG-4 multiplexer, various kinds of frames including square-type fixed frames can be used, and in order to display a desired logo at a predetermined position of an image, MPEG-4 video intracoding is performed on the frames, and the frame data are transmitted to the MPEG-4 multiplexer 165 before IDs are provided.

Figure 9:
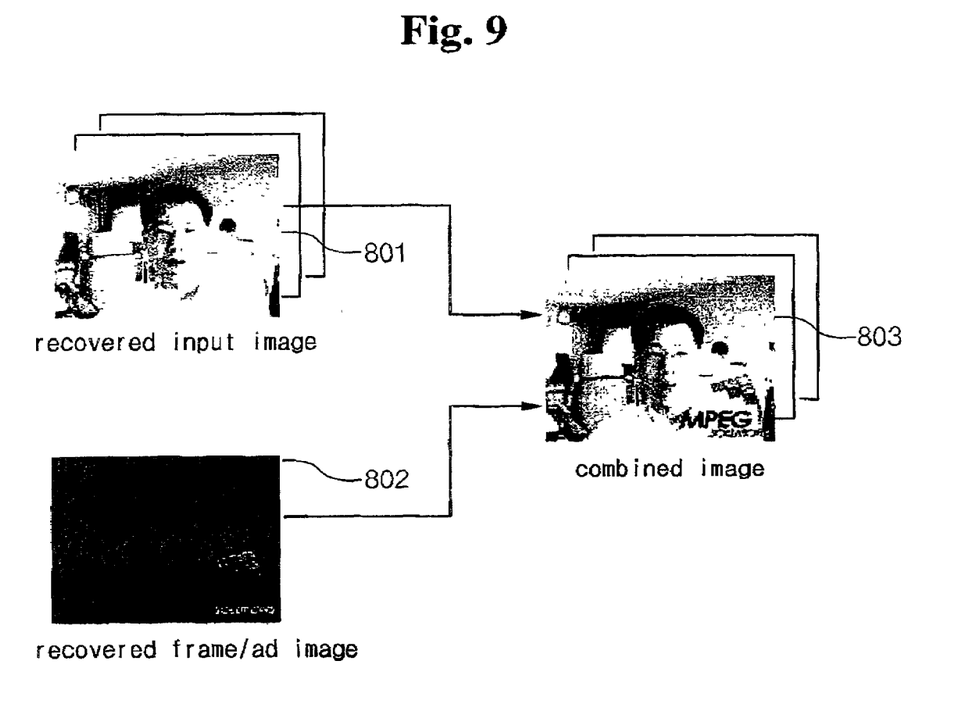
FIG. 9 shows a combination example of an input image and frame data according to a preferred embodiment of the present invention.

In detail, the MPEG-4 multiplexer 165 according to the preferred embodiment combines the frames and images according to a subsequent method. That is, as shown in FIG. 9, in the case of combining the input image 801 and the frame data 802, the MPEG-4 multiplexer 165 sets a predetermined color value of the frame data as a key value, and generates a combined image using the input image when the frame value (e.g., the RGB) is "0", and generates the combined image using the frame data in other cases. In this instance, the use of the frame data is optional. Also, in the case of implementing moving frames using a plurality of frames, ID numbers for distinguishing the respective frames are provided, and when the frames are combined, the IDs are referred to in order to use corresponding frame data.

The MPEG-4 multiplexer 165 for combining the variable frame rates with the image combines the audio data, video data and compressed bit streams of the frame to convert them into bit stream structures of FIGS. 7(a) to 7(e). For this, the video, audio and frame data are transmitted to the MPEG-4 multiplexer 165, and to distinguish the data categories, the respective encoders 163 and 164 generate IDs when transmitting the data to the MPEG-4 multiplexer 165. For example, the ID of the audio data are set to be "1", that of the video data are "2", and the IDs are provided to the foremost portion of the data to be transmitted to the MPEG-4 multiplexer 165.

Referring to FIGS. 7(*a*) to 7(*e*), a structure of the bit stream multiplexer according to the preferred embodiment will now be described.

FIG. 7(*a*) shows a 7-byte bit stream structure of a header of a file format descriptor according to the preferred embodiment. The 4-byte 'header' represents the applicant of the present invention, MPEG Solution, and the 1-byte 'header length' represents a data size of the file format. The 1-byte 'version ID' represents an ID data for controlling the version of the bit stream.

Figure 7A:
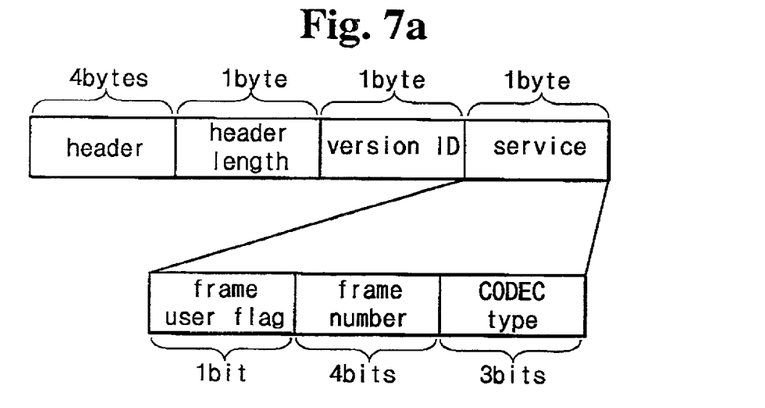

The 1-byte 'service' is analyzed bit by bit as follows. The foremost 1-bit 'frame use flag' shows whether a flag is used, and the next four bits represent the number of frames. The last three bits represent CODEC types. For example, '0×01' and '0×02' respectively show the audio and video signals, and '0×03' shows the multiplexed audio and video signals.

FIG. 7(*b*) shows an 8-byte header structure added to the header of the file format descriptor of FIG. 7(*a*) in the case of using audio signals (this can be known from the CODEC type of FIG. 7(*a*)).

Figure 7B:
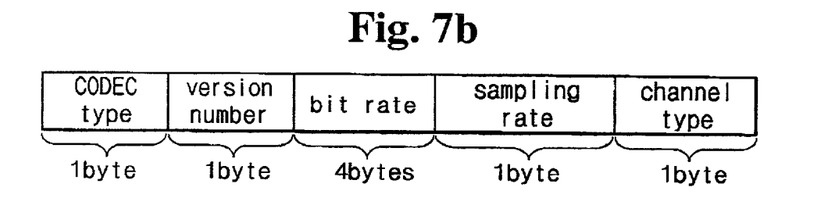

The first 1-byte 'CODEC type' represents the CODEC type of the audio signals, and the 1-byte 'version number' represents the version number of the audio signals. The 4-byte 'bit rate' and the 1-byte 'sampling rate' respectively represent the bit rate and the sampling rate of the audio signals. The last 1-byte 'channeling type' shows whether the audio signals are of a mono type or a stereo type.

FIG. 7(*c*) shows an 8-byte header structure added to the file format descriptor of FIG. 7(*a*) or the stream structure of FIG. 7(*b*) in the case of using video signals (this can be known from the CODEC type of FIG. 7(*a*)).

Figure 7C:
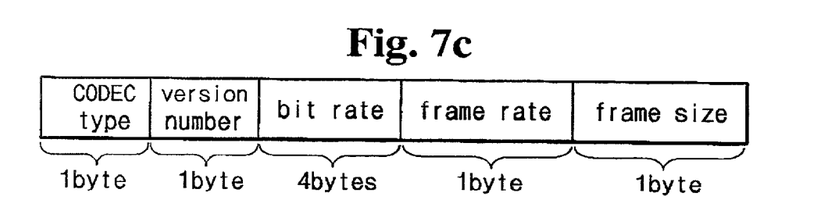
Figure 7D:
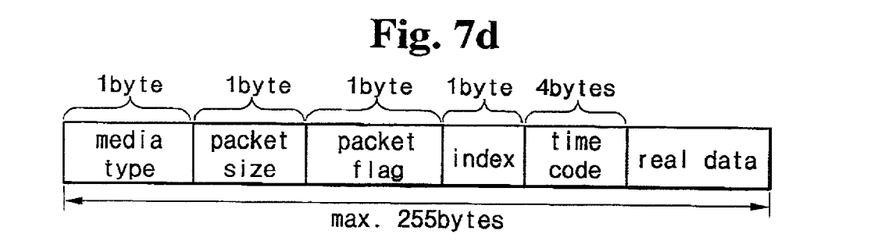
Figure 7E:
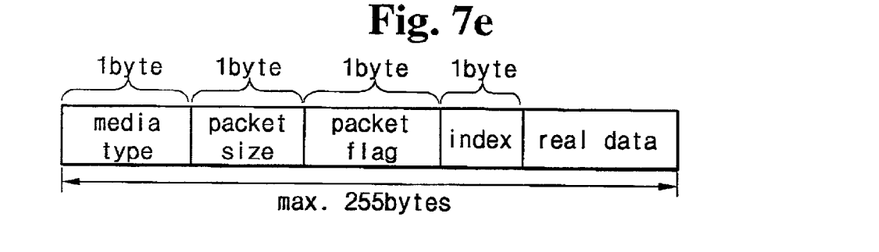

The first 1-byte 'CODEC type' represents the CODEC type of the video signals, and the 1-byte 'version number' represents the version number of the video signals. The 4-byte 'bit rates', the 1-byte 'frame rate' and the 1-byte 'frame size' respectively represent the bit rate, the frame rate and the frame size of the video signals.

FIG. 7(*d*) shows a video packet structure among the actual frame packet structures added to FIGS. 7(*a*) to 7(*c*). The packet structure of FIG. 7(*d*) comprises 255 bytes at a maximum. The initial 1-byte 'media type' represents whether the media are audio data or video data (actually, video data or frame data), and the 1-byte 'packet size' represents the packet size. The 1-byte 'packet flag' distinguishes whether the packet is started, running or ended among the real data, and the 1-byte 'index' represents the index of the real data. The 4-byte 'time code' represents display time of the video signals, and can be applied to the variable frame rates. Remaining bytes are used for the real data.

FIG. 7(*e*) shows an audio packet structure of the real frame packet structure added to FIGS. 7(*a*) to 7(*c*). The packet structure of FIG. 7(*e*) is identical with that of FIG. 7(*d*) excluding the time code. According to the preferred embodiment, the time code for supporting the variable frame rate is not necessary since the audio data are encoded by fixing the respective frames at 100 milliseconds.

Next, an addressee system 300 according to the preferred embodiment will be described.

As shown in FIG. 1, the addressee system 300 comprises a video signal output device 320, an audio signal output device 340 and a moving picture player 360.

The moving picture player 360 receives bit streams from the moving picture mailing server 200, splits the bit streams into compressed audio signals and compressed video signals, decompresses the compressed audio and video signals and respectively outputs digital audio and video signals.

The video signal output device 320 (e.g., graphic cards) receives the digital video signals from the moving picture player 360, converts the same into analog video signals according to time information, and outputs the analog video signals.

The audio signal output device 340 (e.g., sound cards) receives the digital audio signals from the moving picture player 360, converts the same into analog audio signals and reproduces the analog audio signals.

Figure 3:
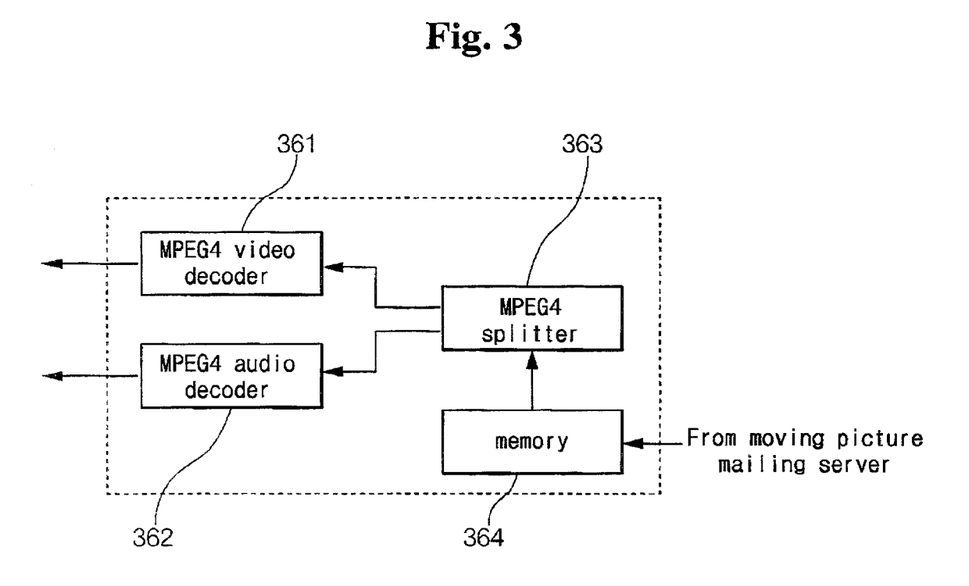
FIG. 3 shows a moving picture player according to a preferred embodiment of the present invention.

FIG. 3 shows the moving picture player 360 according to the preferred embodiment of the present invention.

As shown, the moving picture player 360 comprises an MPEG-4 video decoder 361, an MPEG-4 audio decoder 362, an MPEG-4 splitter 363 and a memory 364.

The memory 364 temporarily stores bit streams transmitted by the moving picture mailing server 200. The MPEG-4 splitter 363 splits the bit streams stored in the memory into audio data, video data, frame data and time information.

The MPEG-4 video decoder 361 decodes the video and frame data split by the MPEG-4 splitter 363 into digital video data, and outputs the decoded video data and the time information to the video signal output device 320.

The MPEG-4 audio decoder 362 decodes the audio data split by the MPEG-4 splitter 363 and outputs the decoded data to the audio signal output device 340.

Figure 4:
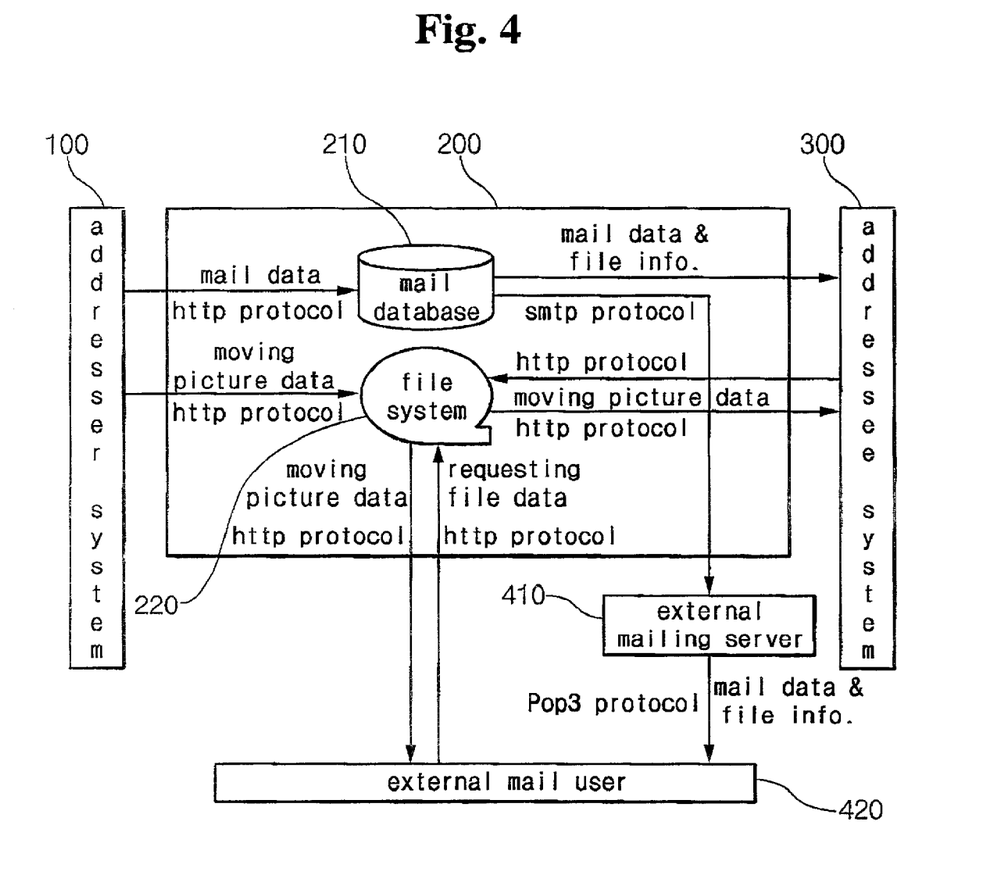
FIG. 4 shows a moving picture mailing server according to a preferred embodiment of the present invention.

The moving picture mailing server 200 as shown in FIG. 4 comprises a mail database 210 and a file system 220.

The mail database 210 stores mail data (text data), transmitted by the addresser system 100 together with the moving picture data, and file information (e.g., file locations of the moving picture data stored in the file system) of the moving picture data, and transmits the mail data and the file information to the addressee system 300 using the http protocol.

The file system 220 receives the moving picture data from the addresser system 100 and stores the same, and in the case the addressee system 300 requires the moving picture data, the file system 220 transmits the stored moving picture data to the addressee system 300 via the http protocol.

Also, in the case the addressee system 300 cannot be accessed via the web, an external mail user 420 such as an Outlook Express user of FIG. 4 can request file data from the file system 220, and in this case, the moving picture mailing server 200 can append the moving picture data file to the mail data and transmit them to the user. Also, the user can only receive the mail data and file information via an external mailing server 410.

Figure 5:
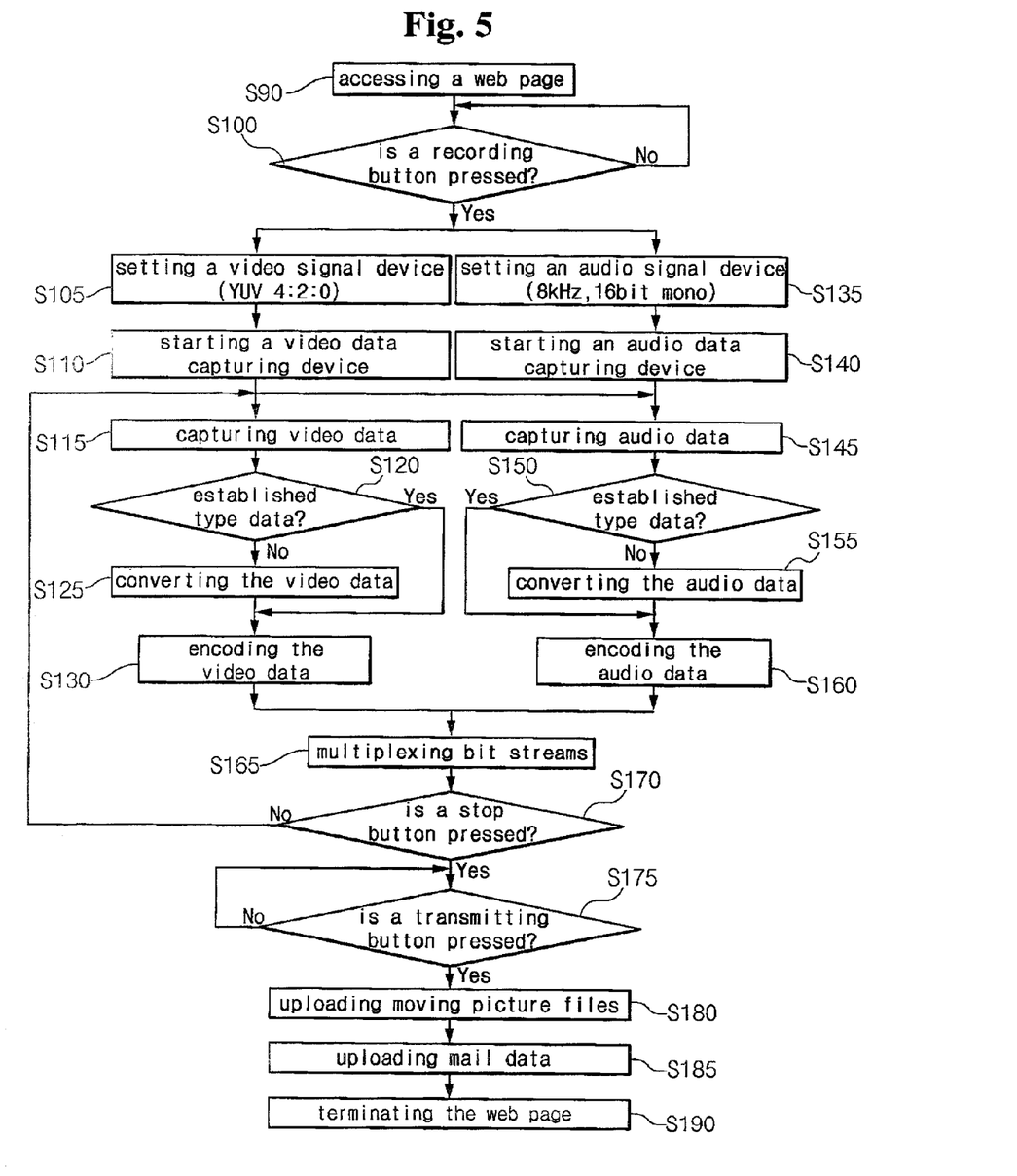
FIG. 5 shows a flowchart of a method for recording and transferring the moving pictures according to a preferred embodiment of the present invention.

Next, referring to FIG. 5, a method for recording the moving pictures and transmitting the moving picture mail will be described.

When a user accesses a web page and presses a moving picture recording button in steps S90 and S100, the addresser system 100 sets a video signal device and an audio signal device in steps S105 and S135. In this instance, according to the preferred embodiment of the present invention, the reference video data is set to be YUV as 4:2:0, and the reference audio data to be 8 kHz sampling frequency and mono signals of 16 bits per sample.

The video signal capturing device 120 and the audio signal capturing device 140 respectively capture external video data and audio data in steps S115 and S145 and determines whether the respective capture video and audio data are matched with the data formats set in the previous steps S105 and S135 in steps S120 and S150.

When it is found that the data are not matched with the data formats, the video data and the audio data respectively captured by the video signal capturing device 120 and the audio signal capturing device 140 are respectively converted into the data formats set in the previous steps S105 and S135 in steps S125 and S155, and they are encoded using the MPEG-4 video and audio signal compression methods in steps S130 and S160. When it is found that the data are matched with the data formats, the video data and the audio data respectively captured by the video signal capturing device 120 and the audio signal capturing device 140 are encoded using the MPEG-4 video and audio signal compression methods in the steps S130 and S160.

The MPEG-4 multiplexer 165 multiplexes the encoded video and audio data to generate combined bit streams, and stores the generated bit streams in the memory 166 in step S165.

The above-described processes are repeated until the user presses a stop button in step S170. If the user has pressed the stop button, it is checked whether the user presses a moving picture mail transmitting button in step S175, and if the user has pressed the moving picture mail transmitting button, the moving picture files and the mail data are uploaded to the moving picture mailing server 200 in steps S180 and S185.

Figure 6:
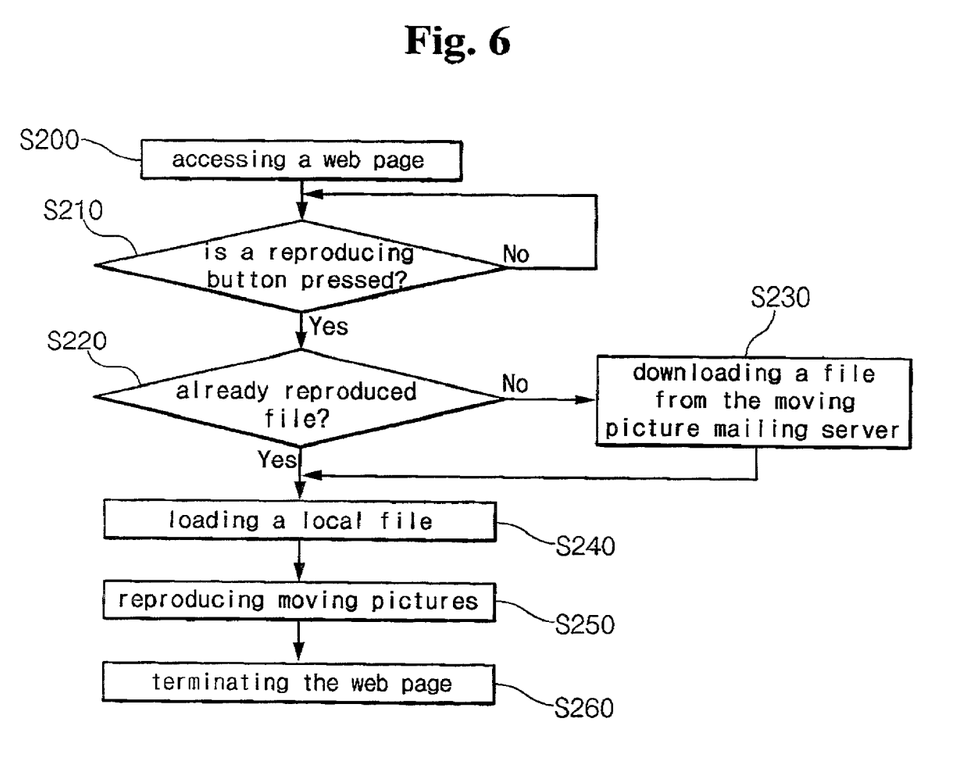
FIG. 6 shows a flowchart of a method for receiving and reproducing the moving pictures according to a preferred embodiment of the present invention.

Next, referring to FIG. 6, a method for receiving moving picture mail and reproducing the moving pictures will be described.

When a user accesses a web page and presses a moving picture reproducing button in steps S200 and S210, the addresser system 100 checks whether the file to be currently reproduced is an already reproduced one in step S220. When it is found that the file is an already reproduced one, a moving picture file previously stored in the memory 364 is loaded in step S240. When it is found that the file is not an already reproduced one, a moving picture file is downloaded from the moving picture mailing server 200 and then stored in the memory 364, and the moving picture file stored in the memory 364 is loaded in step S240.

The user system reproduces the loaded moving picture file to be output in step S250.

In the above-described preferred embodiment, the moving picture recorder 160 and the moving picture player 360 can be implemented in hardware or software manners. In the case of a software implementation, the moving picture recorder 160 and the moving picture player 360 can be implemented by accessing the moving picture mailing server 200, downloading the moving picture recorder and player as plug-in programs and installing them in the user's local computer, or by using an automatic downloading and executing program that automatically downloads the moving picture recorder and player and executes the same when the user accesses the moving picture mailing server 200 in the like manners of the Java Applet by Sun Micro Systems or the Active X control by Microsoft.

In particular, the MPEG-4 video and audio data can be recorded in real time and transmitted to the moving picture mailing server by using the Active X control and a direct show techniques, and then the user can receive the moving picture file from the moving picture mailing server to play moving pictures.

Figure 8:
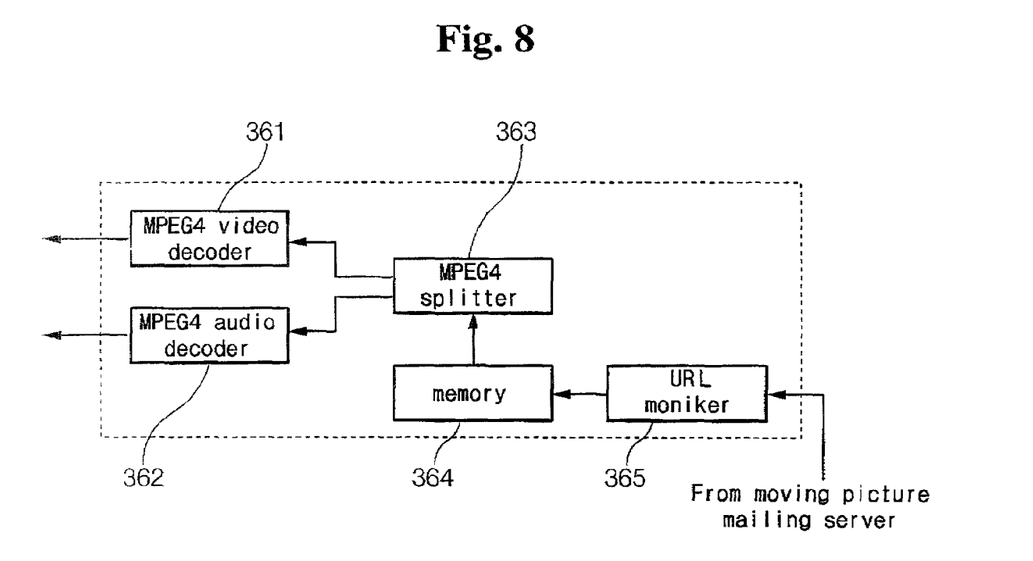
FIG. 8 shows a moving picture player according to a preferred embodiment of the present invention.

FIG. 8 shows a moving picture player implemented by using the Active X control.

Referring to FIG. 8, operations and functions of the MPEG-4 video decoder 361, the MPEG-4 audio decoder 362, the MPEG-4 splitter 364 and the memory identical with those described using FIG. 3 will not be described.

A uniform resource locator (URL) Moniker 365 compares information (or version) of the moving picture player stored in the moving picture mailing server 200 with information of the moving picture player previously downloaded to the addressee system, and in the case the two kinds of information are different, the moving picture player of the moving picture mailing server 200 is automatically downloaded to the user system and is executed, and in the case the two kinds of information are matched, the moving picture player previously set to the user system is executed without downloading the moving picture player of the moving picture mailing server 200. Therefore, according to the preferred embodiment of the present invention, in the case information on the moving picture player stored in the moving picture mailing server 200 is matched with that of the moving picture player set to the addressee system (in most cases), the moving picture mail can be quickly reproduced.

As described above, according to the present invention, since the user can compress and transmit the moving pictures and the audio data in real time and at a desired time frame, a time limit is removed. Also, Since the moving pictures can be received and concurrently compressed, unnecessary storage space is not required, and therefore, storage media are effectively used and managed. Also, since additional frames (e.g., birthday, anniversary and predetermined forms) can be provided in the bit stream format, the user can make various screen configurations for specific purposes according to the user's desires, and the effects of the transmitted contents can be maximized.

Also, since the present invention is compatible with the MPEG-4 bit stream, other players that support the decoding of the MPEG-4 audio and video bit streams can receive and reproduce the moving pictures. In addition, since the compression, transmission and reproduction of the MPEG-4 audio and video bit streams are executed in real time on the web, convenience for the user is maximized.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A moving picture mailing system comprising:
    a video signal capturing device for capturing digital video signals from video signal information of moving pictures;
    an audio signal capturing device for capturing digital audio signals from audio signal information of moving pictures; and
    a moving picture recorder for respectively receiving the video and audio signals from the video and audio signal capturing devices, compressing the video and audio signals using MPEG-4 video and audio compression techniques, multiplexing the compressed signals and transmitting combined bit streams to a moving picture mailing server;
    wherein when mail is transmitted to the moving picture mailing server according to user request, the moving picture recorder transmits the combined bit streams to the moving picture mailing server in realtime together with the mail.

2. The system of claim 1, wherein the moving picture recorder comprises:
an MPEG-4 video encoder for compressing the video signals captured by the video signal capturing device;
an MPEG-4 audio encoder for compressing the audio signals captured by the audio signal capturing device; and
an MPEG-4 multiplexer for multiplexing the compressed video and audio signals respectively output by the MPEG-4 video and audio encoders and outputting the combined bit streams.

3. The system of claim 2, wherein the moving picture recorder further comprises a memory for temporarily storing the bit streams output by the MPEG-4 multiplexer.

4. The system 2, wherein the moving picture recorder further comprises a video format converter for converting the video signals captured by the video signal capturing device into signals of a reference video signal format.

5. The system of claim 4 wherein the reference video signal format is defined as YUV 4:2:0.

6. The system of claim 2, wherein the moving picture recorder further comprises an audio format converter for converting the audio signals captured by the audio signal capturing device into signals of a reference audio signal format.

7. The system of claim 2, wherein the MPEG-4 video encoder is a simple profile encoder of the MPEG-4 video part.

8. The system of claim 2, wherein the MPEG-4 audio encoder, is a code excited linear prediction (CELP) encoder of the MPEG-4 audio part.

9. The system of claim 2, wherein the MPEG-4 multiplexer varies frame rates for compressing signals according to hardware performance.

10. The system of claim 9, wherein time information that captures an input image is inserted to the bit streams output by the MPEG-4 multiplexer for each frame.

11. The system of claim 2, wherein the MPEG-4 multiplexer combines various frames and digital video data.

12. The system of claim 11, wherein the MPEG-4 multiplexer combines the frames and digital video data input by setting a predetermined color of the frame data as a key value.

13. The system of claim 1, wherein the system further comprises:
a moving picture player for receiving the bit streams from the moving picture mailing server, splitting the same into compressed video and audio signals, decompressing the compressed video and audio signals and outputting digital video and audio signals;
a video signal output device for reproducing the digital video signals output by the moving picture player as analog video signals; and
an audio signal output device for reproducing the digital audio signals output by the moving picture player as analog audio signals.

14. The system of claim 13, wherein the moving picture player further comprises:
a memory for temporarily storing the bit streams transmitted by the moving picture mailing server;
an MPEG-4 splitter for splitting the bit streams stored in the memory into audio data video data frame data and time information;
an MPEG-4 video decoder for decoding the video data and the frame data split by the MPEG-4 splitter by using the MPEG-4 technique, and outputting the decoded video data and the time information to the video signal output device; and
an MPEG-4 audio decoder for decoding the audio data split by the MPEG-4 splitter by using the MPEG-4 technique, and outputting the decoded audio data to the audio signal output device.

15. The system of claim 14, wherein the moving picture recorder and the moving picture player are downloaded from the moving picture mailing server to be installed by a user.

16. The system of claim 14, wherein by an implementation of an automatic-download automatic execution program, the moving picture recorder and the moving picture player are automatically downloaded to a user system when the user system accesses the moving picture mailing server.

17. The system of claim 16, wherein the moving picture player further comprises a network data access filter for comparing information on the moving picture player of the moving picture mailing server with information on the moving picture player previously downloaded and set to the user system, and in the case the two kinds of information are different, enabling the moving picture player of the moving picture mailing server to be automatically downloaded to the user system and executed.

18. A moving picture mailing method comprising:
(a) capturing digital video and audio signals from information on video and audio signals of moving pictures;
(b) compressing the video and audio signals using MPEG-4 video and audio compression techniques; and
(c) multiplexing the compressed signals and transmitting combined bit streams to a moving picture mailing server;
wherein when the mail is transmitted to the moving picture mailing server according to user request, the combined bit streams are transmitted to the moving picture mailing server in realtime together with the mail.

19. The method of claim 18, the method further comprising:
determining whether the digital video and audio signals captured in (a) are respectively matched with predetermined data formats; and
converting the captured digital signals into signals of the predetermined data formats in the case the captured signals in (a) are not matched with the data formats.

20. The method of claim 18, wherein the MPEG-4 video compression technique is a simple profile encoding technique of the MPEG-4 video part.

21. The method of claim 18, wherein the MPEG-4 audio compression technique is the code excited linear prediction (CELP) of the MPEG-4 audio part.

22. The method of claim 18, wherein frame rates for compressing signals according to hardware performance are varied to generate bit streams in (c).

23. The method of claim 22, wherein time information that captures an input image is inserted to the generated bit streams for each frame.

24. The method of claim 18, wherein the method further comprises:
receiving the bit streams from the moving picture mailing server and splitting them into compressed video and audio signals;
decompressing the compressed video and audio signals and outputting digital video and audio signals; and
reproducing the output digital video and audio signals as respective analog video and audio signals.

* * * * *